United States Patent Office.

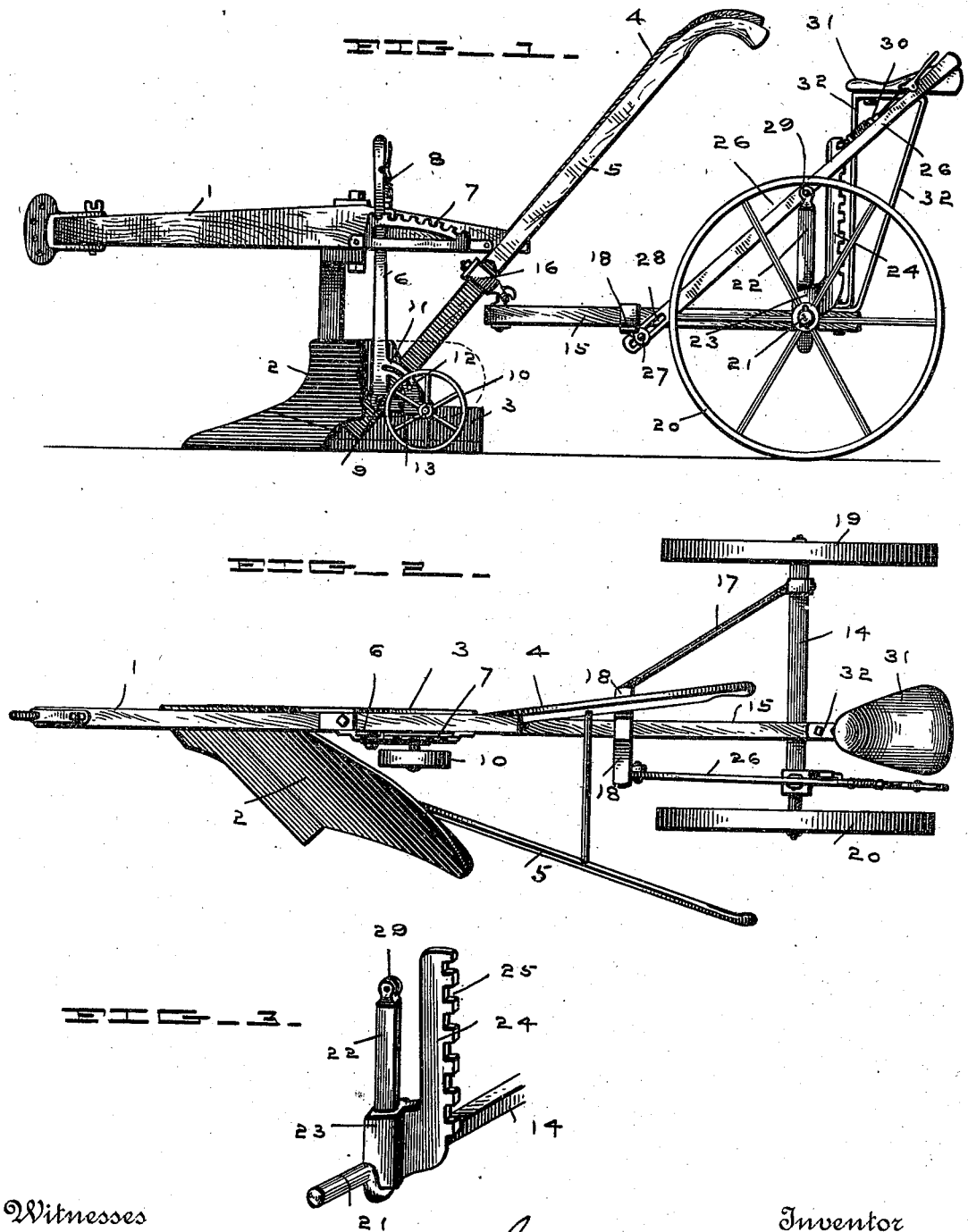

GEORGE BALDWIN, OF INDIANAPOLIS, INDIANA, ASSIGNOR OF ONE-HALF TO PATRICK DONOHUE, OF SAME PLACE.

PLOW.

SPECIFICATION forming part of Letters Patent No. 504,294, dated August 29, 1893.

Application filed April 3, 1893. Serial No. 468,755. (No model.)

*To all whom it may concern:*

Be it known that I, GEORGE BALDWIN, of Indianapolis, county of Marion, and State of Indiana, have invented certain new and useful Improvements in Plows; and I do hereby declare that the following is a full, clear, and exact description thereof, reference being had to the accompanying drawings, in which like numerals refer to like parts.

My invention relates to new and useful improvements in plows, and especially to a riding attachment and accompanying draft wheel, and it will be understood from the following description.

In the drawings, Figure 1 is a side elevation of a plow, showing my improved riding attachment and draft wheel attached, the share of the plow partly broken away. Fig. 2 is a top plan view of the same. Fig. 3 is a detail view of a part of the main axle of the riding attachment, showing the method of attaching the stub axle which carries one of the wheels.

In detail, 1 represents the draft beam of the plow, 2 the plow-share, 3 the mold board, 4 the outer and 5 the inner handle bar, all of any suitable form and construction, the latter being connected at their lower ends to the share and mold board in the ordinary manner. To one of these on the inner side is pivoted a lever 6 which extends up and works within a bracket 7 having a toothed rack on its top and secured to the side of the draft beam, 8 being a spring lock secured to the upper end of the lever 6, and its bolt adapted to engage with the teeth of the rack 7 at any desired point, and thereby retain the lever 6 in a fixed position. The lower end of the lever 6 is formed with an L shaped arm which extends to one side of its pivotal point 9, and carries in its outer end the pivoted draft wheel 10, a curved slotted arm connecting the outer end of this arm with the lever 6, and a headed pin 12 which is secured to the land side of the plow working through this slot, as shown in Fig. 1. A hole or opening 13 is also formed at about the center of the arm, so that the pivotal point of the lever 6 may be changed to adjust the wheel 10 toward the front of the plow when the riding attachment is removed or it be otherwise desired. The wheel 10 is preferably about twelve inches in diameter with a tire three inches wide.

The riding attachment consists of an axle 14, and a draft beam 15, the latter detachably connected at its forward end to a shackle 16 which is secured around the land side handle bar 4 of the plow. The axle 14 and draft beam 15 are also connected by a brace rod 17, which on either side of its point of connection with the draft beam is flattened out as at 18, forming the foot rests shown in Fig. 2.

The land wheel 19 of the riding attachment is mounted in the ordinary manner, but the furrow wheel 20 is mounted on the end of a stub axle 21, whose inner end is upturned and squared, as shown at 22, and works loosely in a square collar or bearing 23 formed on the end of the main axle 14, a rack 24 being also formed on the side of the collar 23, and is provided with a series of teeth 25.

26 is a lever having a slot 28 in its lower end, a pin 27 working through a bracket secured to the inner foot rest 18 passing through this slot 28 for the purpose of forming a bearing or fulcrum for its lower end. At about its center, the lever 26 is pivoted at 29 to the upturned end 22 of the stub axle 21 before mentioned, and on the outer end of the lever is a spring lock 30, its bolt adapted to engage with the teeth 25 of the rack 24.

31 is a seat supported upon upright springs or strips, the lower ends of which are attached to the rear end of the draft beam of the riding attachment. The lever 26 lies to one side of the driver's seat, and when the plow is in operation the wheel 20 runs in the furrow and the wheel 19 on the land which has not yet been plowed, and to lower the wheel 20 so that the axle will be horizontal, all that is necessary to do is to depress the outer end of the lever 26, forcing down the upturned end 22 of the stub axle 21, and carrying down with it the wheel 20 until the main axle 14 is on a horizontal line, when the bolt of the spring lock 30 will have engaged with the teeth in the rack 24, and the wheel will remain in such lowered position until the bolt be released from the rack, and there being a number of teeth on this rack the wheel can be adjusted to the depth of the furrow.

The riding attachment is secured to the plow directly or nearly in line with the draft beam itself, so that the twisting and jerking motion that is common with many riding attachments owing to their being connected out of line with the plow beam is prevented, and by having two wheels of the same size and rather large on the riding attachment, jerking due to unevenness of the ground is prevented. In the manner of lowering the inner wheel 20 to correspond with the depth of the furrow a great advantage is obtained over the attachments where one wheel is made smaller than another, or where both wheels are made the same size, and no means provided for adjusting one, for in my riding attachment as soon as the operator is through plowing and goes on level ground, he can raise the inner wheel 20 to its normal position, where it will be on a line with the wheel 19.

In order to prevent the riding attachment from increasing the draft of the plow, it is necessary to use the wheel 10 to decrease the draft, and when the arm to which the wheel 10 is pivoted is attached to the plow at the point 9, the wheel is so far back that it would not carry the plow balanced without the pull of the riding attachment. My plow also can be turned from one hundred and twenty to one hundred and seventy-five degrees in relation to the riding attachment.

One object of the wheel 10 is to reduce the draft of the plow while plowing by supporting the plow to some extent, and thus tending to reduce the friction of the lower part of the plow against the ground. The wheel can be adjusted to suit any plow in this regard by means of the lever 6 and pivoting the wheel supporting arm in the hole 13.

The second object of the wheel 10 is to support the plow off the ground while it is being transported from one place to another. This is accomplished by throwing the lever 6 backward, whereby the wheel 10 is thrown under the plow and the plow raised so that it will ride on the wheel from four to six inches from the ground, or less, as adjusted. This wheel has also the advantage while plowing in releasing the plow from roots and other similar obstructions. In such case, the plowman by pulling on the lever 6 can throw the wheel 10 downward and by his leverage lift the plow upward and rearward, whereby the plow is withdrawn from its former position, while the driver remains in his seat on the riding attachment.

Another advantage of the wheel 10 is that in turning at corners, by tipping the handles downward the whole plow will be made to ride on the wheel and then can be easily turned on it, or be easily drawn backward, if desired.

Still another important advantage of the wheel 10 consists in its ability in connection with the lever 6 to give the plow point any desired pitch, so that the plow can be made to cut deeper or more shallow if desired, and when the point becomes dulled somewhat, instead of changing the clevis of the plow or continually lifting up the handles, the wheel 10 can be set a little lower down, whereby the plow will run at a regular depth and be kept in the ground, and as the point further wears the wheel can be further adjusted to suit the dullness of it.

In using the plow without the attachment, it is preferable to change the pivot point of the lever 6 to the outer hole or opening 13, thus bringing the draft wheel toward the forward end of the share and more equally dividing the weight. The bracket 11 connecting the lever 6 and its arm tends to strengthen both the lever and the arm, and the headed pin 12 which works through the slot in the bracket 11 prevents any side or twisting movement of the wheel 10.

My draft and riding attachments, as will be seen, are composed of few parts, are simple in construction and operation, and are adapted to be attached or detached from the plow quickly, thus giving the owner of an ordinary plow the advantages of both a walking and a riding plow, while with the draft attachment alone time and labor are saved, and a larger area may be plowed within a given time.

What I claim as my invention, and desire to secure by Letters Patent, is the following:

1. In a plow, the combination of a bent lever pivoted at its bend to the plow immediately behind the mold board, a ground wheel mounted on one end of such lever, a handle at the other end of such lever, means for retaining such handle at any desired position, a curved slotted arm connecting the arms of such lever, and a headed bolt attached to the land side of the plow and operating in such slot, substantially as shown and described.

2. In a plow, the combination of a bent lever pivoted at its bend to the plow immediately behind the mold board, a ground wheel mounted on one end of such lever, a handle on the other end thereof, a notched guide secured to the plow beam through which such handle operates, and a spring bolt attached to such handle and adapted to lock such handle at any point of such notched guide, substantially as shown and described.

3. The combination with a plow of a carriage attached to the plow, and an adjustable draft reducing ground wheel mounted on the plow immediately behind the mold board, substantially as shown and described.

In witness whereof I have hereunto set my hand this 31st day of March, 1893.

GEORGE BALDWIN.

Witnesses:
H. D. NEALY,
N. D. TILFORD.